United States Patent
Aylesworth

(10) Patent No.: US 9,334,748 B1
(45) Date of Patent: May 10, 2016

(54) PRO SYSTEM USING A HOLLOW FIBER MEMBRANE WITH SUPERPARAMAGNETIC NANOPARTICLE DRAW SOLUTION

(71) Applicant: Terrence W. Aylesworth, Algonquin, IL (US)

(72) Inventor: Terrence W. Aylesworth, Algonquin, IL (US)

(*) Notice: Subject to any disclaimer, the term of this patent is extended or adjusted under 35 U.S.C. 154(b) by 501 days.

(21) Appl. No.: 13/987,129

(22) Filed: Jul. 1, 2013

(51) Int. Cl.
| | |
|---|---|
| *F01D 15/10* | (2006.01) |
| *B01D 63/02* | (2006.01) |
| *B01D 61/00* | (2006.01) |
| *C02F 1/44* | (2006.01) |
| *B01D 61/02* | (2006.01) |

(52) U.S. Cl.
CPC .............. *F01D 15/10* (2013.01); *B01D 61/002* (2013.01); *B01D 61/005* (2013.01); *B01D 61/027* (2013.01); *B01D 63/02* (2013.01); *C02F 1/442* (2013.01); *C02F 1/445* (2013.01); *B01D 2311/2607* (2013.01)

(58) Field of Classification Search
CPC .......... F01D 15/10; C02F 1/445; C02F 1/442; B01D 63/02; B01D 61/002; B01D 61/005; B01D 61/027; B01D 2311/2607
See application file for complete search history.

(56) References Cited

U.S. PATENT DOCUMENTS

| | | | |
|---|---|---|---|
| 2,116,920 | A | 5/1936 | Wickenden |
| 3,171,799 | A | 3/1965 | Batchelder |
| 7,871,522 | B2 | 1/2011 | Stover et al. |
| 8,197,693 | B2 | 6/2012 | Al-Jlil |
| 2007/0278153 | A1 | 12/2007 | Oriard et al. |
| 2010/0051557 | A1 | 3/2010 | Etemad et al. |
| 2011/0155666 | A1 | 6/2011 | Prakash et al. |

OTHER PUBLICATIONS

The van't Hoff Factor, http://www.kentchemistry.com/links/math/vant%20hoff.htm, Jun. 2013.
GE, Q.C, Hydrophilic Superparamagnetic Nanoparticles: Synthesis, Characterization, and Performance in Forward Osmosis Processes, Ind.Eng. Chem. Res. 2011, 50, 382-388.
Ling, M.M., Highly Water-Soluble Magnetic Nanoparticles as novel Draw Solutes in Forward Osmosis for Water Reuse, Ind.Eng. Chem. Res. 2010, 49, 5869-5876.
Small Hydropower Systems, U.S. Department of Energy, Jul. 2001. DOE/GO-102001-1173, FS217.
2005 Residential Energy Consumption Survey, U.S. Energy Information Admin., http://www.eia.gov/emen/recs2005/c&e/summary/pdf/tableus1part1.pdf.

(Continued)

*Primary Examiner* — David A Reifsnyder
(74) *Attorney, Agent, or Firm* — David A. Gottardo, Esq.

(57) ABSTRACT

An array of hollow fiber membranes is grouped into bundles is submerged in an enclosed pure-water bath. The bundles are potted into top and bottom membrane headers such that the fiber lumen (the inside of the hollow fiber) is open to the inside of the membrane header and the pure feedwater is prevented from leaking into either the header or into the inside of a hollow fiber. Pure water penetrates the hollow fiber membrane. In accordance with pressure retarded osmosis (PRO) principles, the permeate and draw solution within the lumen are transported to at least one hydroturbine where electricity is generated. The draw solution contains superparamagnetic nanoparticles that are prevented from proceeding beyond a magnetic field. The system has a heater to improve its efficiency.

16 Claims, 5 Drawing Sheets

(56) References Cited

OTHER PUBLICATIONS

Location Efficiency and Housing Type—Boiling it Down to BTUs, USEPA. http://www.epa.gov/smartgrowt/location_efficiency_BTU.htm, Jun. 2013.

Cath, T.Z. Forward Osmosis, Principles, Applications, and Recent Developments, J. Membrane Sciences, 2006, 281,70-87, Elvesier.

Kim, Y.C et al Potential of osmotic power generation by pressure retarded osmosis using seawater as feed solution: Analysis and experiments, J. Membrane Sciences, 2013, 429.

Latorre, M., et al, Application of Magnetic Nanoparticles in Medicine: Magnetic Fluid Hyperthermia, Puerto Rico Health Science Journal, vol. 28, 3, Sep. 2009.

PRO SYSTEM USING A HOLLOW FIBER MEMBRANE WITH SUPERPARAMAGNETIC NANOPARTICLE DRAW SOLUTION

BACKGROUND OF THE INVENTION

This invention relates to a pressure retarded osmosis (PRO) system for the production of electricity. More particularly, it relates to a closed-loop, PRO system for creating a high pressure water flow that acts upon one or more hydroturbines generator to produce renewable, sustainable energy without a waste stream.

Osmosis is the natural, universal and biologically ubiquitous movement of a solvent, such as water, through a selectively semi-permeable membrane from a region of low solute concentration solution to a region of comparably high solute concentration solution. The selectivity of the membrane allows for the passage of the solvent while preventing the passage of larger solute molecules through the relatively smaller membrane pores. The natural passage of water through a membrane is driven by the difference in the solute concentrations on either side of the membrane. The lower the solute concentration, the greater the driving force of its solvent to permeate the membrane. In other words and in accordance with the second law of thermodynamics, each of the solutions separated by the semi-permeable membrane seeks an equivalent solute concentration. If the membrane contains pores of a size that prevents the passage of solute molecules, (solute molecules here are superparamagnetic nanoparticles), and only allows passage of the solvent, then the solvent (the pure water) will permeate across the membrane until the solutions on either side of the membrane are of equal concentration. If two differing concentration solutions are separated by a semi-permeable membrane, the solvent of the lower concentration solution will pass the membrane to dilute the higher concentration solution, until the concentrations of the two solutions are equal. This driving force is known as osmotic pressure. When resistive forces are applied to this osmotic force, the result is referred to the net osmotic driving force. Since this resistive force retards the original osmotic pressure, it is called pressure retarded osmosis (PRO). This resistive force can be the performance of work, such as acting upon a hydroturbine generator to create electricity.

Driven by the inflow of permeate, a superparamagnetic nanoparticle solution (also called a ferrofluid) is forced out of the membrane area, into membrane headers, through a bulkhead fitting, through a effluent header and eventually to the hydroturbine housing(s). The pressurized water acts upon a hydroturbine generator, creating electricity.

The use of a a ferrofluid as a PRO draw solution, makes this technology simple and economically feasible, because the ferrofluid's location can be controlled by a magnetic field. If the draw solution's location was not controlled, it would be swept away in the effluent flow out of the membrane system, and there would be a need to continuously replace it. Using either a series of permanent magnets or a solenoid-type electromagnet, to create and maintain a steady magnetic field, the ferrofluid draw solution is retained within the active membrane area of the PRO system. The ferrofluid solution is thereby referred to as an osmotic membrane system retentate. As the ferrofluid/water solution approaches the magnetic field, the magnetic particles are prevented from moving through the magnetic field. The water separates from the nanoparticles, continues through the magnetic field and is ultimately returned to the feed water side of membrane within the water-tight enclosure. Therefore, the ferrofluid/water solution is retained at a consistent, and uniform concentration within the area between the permeate side of the membrane surface area, throughout the hydroturbine housing, and up to the magnetic field. The permeate water separates from the magnetic nanoparticles, continues through the magnetic field, through a temperature control heater, back to the feed side of the membrane.

The relationship between the concentration of superparamagnetic nanoparticles on the draw solution (permeate) side of the membrane, the concentration of the solute on the feed side of the membrane, and the osmotic pressure of permeate water, is of key importance. The higher the difference in solution concentration, the higher the osmotic pressure, and the higher is the electrical generation potential. The general equation describing water flux permeating a membrane in a PRO system is known as the Morse Equation. Jacobus Henricus van't Hoff (30 Aug. 1852-1 Mar. 1911) first proposed a formula for calculating osmotic pressure for which he was awarded the inaugural Nobel Prize in Chemistry in 1901. This formula was later improved upon by Harmon Northrop Morse (Oct. 15, 1848-Sep. 8, 1920). The current formula is known as the Morse Equation, and is defined as;

$$J_W = A(\sigma\Delta\pi - \Delta P), \text{ where}$$

$J_W$ is the water flux,

A the water permeability constant of the membrane $\sigma$ is the reflection coefficient $\Delta\pi$ is the osmotic pressure differential $\Delta P$ is the applied pressure.

The osmotic pressure, $\pi = iMRT$, where i is the dissociation factor or the dimensionless van't Hoff factor M is the molarity or the concentration of the solution, moles/L $R = 0.08206$ L·atm·mol$^{-1}$·K$^{-1}$, the universal gas constant T is the absolute temperature, degrees Kelvin The Morse equation can be used to define each solution's osmotic pressure on either side of the membrane. The difference between the two pressures on either side of the membrane ($\Delta\pi$), becomes the total pressure of the membrane system. Therefore, the total pressure of the PRO system, $\Delta\pi$, is equal to $(iMRT)_f - (iMRT)_p$, where f is the feedwater side of the membrane, and p is the permeate side of the membrane. Assuming that each side of the membrane is at the same temperature, and the constant R is the same, then $(RT)_f = (RT)_p$, and you are left with the linear relationship, $\Delta\pi = (iM)_f - (iM)_p$.

For most non-electrolytes dissolved in water, the van't Hoff factor[1] is essentially one. For most ionic compounds dissolved in water, the van't Hoff factor is equal to the number of discrete ions in a formula unit of the substance. Since nanoparticles are not 'dissolved' in water, they need to be chemically treated with a dispersant, a so called surface ligand, that keeps them suspended in a stable suspension. Otherwise, the particle would settle in the water solution, or adhere to and agglomerate with other particles. Researchers Ge[2], et al have approximated the molecular weight of the surface ligands surrounding each magnetic nanoparticle to quantify the osmotic pressure of the draw solution. They report that this is appropriate since it is the surface ligands that function to extract the water across the membrane in the forward osmosis process.

The net osmotic pressure of a PRO system with a hypothetical draw solution concentration of 40% (weight/weight) superparamagnetic nanoparticles on one side of a membrane, and pure water on the other side, can be calculated as follows: the osmotic pressure of the pure feedwater side of the membrane is negligible, is in effect zero. The osmotic pressure of the 40% ferrofluid solids side of the membrane is more difficult because as a solid, a nanoparticle has no molecular weight, and hence no mole weight per unit liter. Therefore, an estimate will be used based on the osmotic pressure of seawater. Seawater is composed of approximately 3.4% dissolved solids (34,000 mg/L sodium chloride), and has an osmotic pressure of approximately 390 pounds per square inch (psi). Since the relationship between concentration of dissolved solids and osmotic pressure is linear, a 40% (400,000 mg/L) solution of nanoparticles would be approximately 4,588 psi.

Experimental results reported by Ling[3] et al assert a flat-sheet membrane water flux of 13.5 liters per square meter of membrane area, per hour, (LMH), at the measured osmotic pressure of 73 atmospheres (atm) (at 14.7 pounds per square inch (psi) per atm, 73 atm=1,073 psi). These flux results, if applied to a 500 square meter ($m^2$) submerged hollow fiber membrane, such as in FIG. 1 in Ling (65.4" long, 35.2" wide, and 95.4" high, or approx. 219,620 cubic inches), would yield 112.5 liters per minute (which is 30 gallon per minute, gpm) at a pressure of 1,073 psi.

Using a DOE provided micro hydro power calculation, [net head (feet)×flow (gpm)÷10=Watts][4], the power generation potential of the aforementioned 500 $m^2$ hollow fiber membrane PRO system can be calculated. The psi to foot of head conversion factor is 1 psi=2.307 foot of head. Therefore, Ling's experimentally obtained osmotic pressure, 1,073 psi× 2.307=2,475 feet of head. Furthermore, 2,475 feet of head×30 gpm÷10=7,425 Watts (W). A standard PRO power density characterization is measured in Watts per meter squared, or $W/m^2$. A power density of 7,425 W/500 $m^2$, would equate to 14.85 $W/m^2$.

Converting Watts to BTU/hour, (1 Watt=3.412 BTU/hr), 7,425 Watts is equal to 25,334 BTU/hr or 222 million BTUs per year. Assuming an average households energy consumption rate of 100 million BTU per household, per year (obtained from a U.S. Energy Information Administration survey[5], then the 500 $m^2$ membrane PRO unit could produce more than twice the amount of power that the average household uses in a year. In addition, according to the U.S. Environmental Protection agency (EPA)[6], the average household energy used is approximately equal to the transportation energy used. Therefore, one 500 $m^2$ membrane PRO unit could provide a household's home energy and the transportation energy requirements of an electric car.

The usual application of pressure retarded osmosis is to desalinate seawater and at the same time produce electricity as taught by Loeb in U.S. Pat. No. 4,193,267, by Al-Jlil in U.S. Pat. No. 8,197,693, and in a hybrid RO/PRO system by Stover, et. al. in U.S. Pat. No. 7,871,522. The key basic characteristics of an osmosis system, in addition to the type of osmosis, are the type and composition of the membrane; and the type and composition of the draw solution. Membranes can either be flat sheet membranes in a plate-and-frame configuration or in a spiral-wound configuration; or could be tubular. In turn, tubular membranes can be either tubes or hollow fibers. Cath et al[7] discuss the advantages of hollow fiber membranes. They point out that hollow fiber membranes can support high hydraulic pressure without deforming and can be easily packed in bundles directly within a holding vessel. They are also relatively easy to fabricate in modular form. Also, they allow liquids to flow freely on the feed side of the membrane. Other advantages of hollow fiber membranes are they are much cheaper to manufacture and they can have several hundred times the surface area per unit volume than flat sheet or spiral wound membranes.

A variety of compositions can be used for the draw solution. In an early commercial application of forward osmosis (FO), Wickenden in U.S. Pat. No. 2,116,920 teaches the use of calcium chloride as a draw solution in the concentration of fruit juices. In another early patent, Batchelder in U.S. Pat. No. 3,171,799 teaches the use of a volatile solute, such as sulfur dioxide, in a draw solution for the demineralization of water. Recently interest in draw solutions has centered on those containing magnetic nanoparticles. Magnetic particles in the draw solution have the advantage of being readily separated from the product water of a purification or desalination process with use of magnetic fields. They can also be readily recycled back into the draw solution. A kind of nanoparticles that is currently of interest is a material referred to as Magnetoferritins. As Oriard et al describe in US 2007/0278153, it is magnetite bound to a protein such as ferritin wherein the magnetite is the core and the protein is the spherical cover. The use of magnetite nanoparticles is also taught by Etemad et al in US 2010/0051557 in the context of removing heavy metals from aqueous media by means of adsorption and magnetic capturing. Etemad et al mention that the magnetite is superparamagnetic but does not indicate whether they are coated with a protein. Superparamagnetic iron oxide nanoparticles (SPIONs) are also the subject of intense research for various biomedical applications as described by Latorre et al[8].

An increase in feedwater temperature in an osmotically driven process can increase the flux considerably. Kim and Elimelech[9] report that an increase in feedwater temperature from 20° to 30° C., (from 68° to 86° F.) will result in an increase in water flux of 50.5%, from 9.23 to 13.89 $L/m^2 h$, for a resulting power density increase of 46.6%, from 3.22 to 4.72 $W/m^2$

SUMMARY OF THE INVENTION

An array of hollow fiber membranes is submerged in an enclosed pure-water bath. A large number (100's to 1,000) of these hollow fiber membrane strands are grouped together into bundles and potted into membrane headers on the top and at the bottom of the pure-water enclosure. The fiber bundles are potted, or sealed into one of several top and bottom membrane headers such that the fiber lumen (the inside of the hollow fiber) is open to the inside of the membrane header and the pure feedwater is prevented from leaking into either the header or into the inside of a hollow fiber.

The pure-water solvent passes through the membrane from the outside of the hollow fiber to the inside of the fiber due to the osmotic pressure created by a highly concentrated, colloidal draw solution of superparamagnetic nanoparticles inside the hollow fibers. As water permeates a membrane, the volume and pressure of the water/draw solution on the inside of the hollow fiber membrane increases. The water/draw solution collects in the top membrane headers in which the membrane bundles are potted.

In one design, the top membrane headers are connected to a single effluent header that exits the pure-water enclosure through a water-tight fitting. Outside the enclosure, the effluent header is connected to a hydroturbine housing. Because of increased pressure and volume, the water/draw solution stream acts upon the hydroturbine to produce electricity. Upon exiting the hydroturbine at lower pressure, the water/draw solution stream flows through a magnetic field that separates the superparamagnetic particles from the pure-water that is returned to the pure-water enclosure. The superparamagnetic particle draw solution is maintained in a uniform concentration from the magnetic field, through the hydroturbine, and throughout the membrane system.

In an alternative design, each of the top and bottom membrane headers extends through a water-tight bulkhead fitting to the outside of the water-bath enclosure and is fitted with its own hydroturbine. This design has the advantage of reducing pressure loss (line loss) that would result in piping the pressurized fluid through the necessary header pipe length and elbows needed to transport the pressured fluid from individual membrane headers to a single effluent header and single hydroturbine. By fitting a hydroturbine on the end of each membrane header, the higher pressure fluid can be converted more directly into mechanical energy by the hydroturbine and correspondingly into electrical energy, at a point in the solution flow where the fluid is at a higher pressure. This leads to producing a greater amount of energy. Owing to the close spacing of the membrane headers and the relatively large size hydroturbine housing, alternating membrane headers extend through the bulkhead fitting to the outside of the pure-water enclosure. In this way, half of the hydroturbines, in an alternating fashion, are fitted to one side of the enclosure and half are fitted to the opposite side.

In yet another alternative design, each membrane bundle is potted directly into a membrane effluent pipe to a bulk-head fitting. The pipe would extend through a bulkhead fitting to a hydroturbine, with a hydroturbine for each membrane fiber bundle. A straight section of pipe from the membrane fiber bundle to the hydroturbine would provide the least amount of fluid friction and correspondingly, the lowest line loss to allow higher, more efficient electrical generation rates. Owing to the close spacing of fiber bundles and the relatively large hydroturbine housing, alternating membrane effluent pipes extend through the top of the pure-water enclosure, with the other half extending through its bottom. A service connection would be fitted to each membrane bundle on the opposite side of its hydroturbine to allow for nanoparticle removal and off-line service.

In each of the embodiments, there is a closed circuit in which water (that was previously permeate) is recycled into the enclosed pure-water bath (to become feedwater) without coming in contact with the outside environment and possible water-borne microbes. Hence, one object of the invention to provide a sterile, closed-loop pressure retarded osmosis system in which pure water is recycled.

As each of these embodiments has the pressurized permeate/draw solution acting upon a hydroturbine that is outside of the water-bath enclosure, it is another object of the invention to prevent an electrical hazard from hydroturbine electrodes shorting out in the water solution.

In each of the embodiments of this invention, after passing through the hydroturbine(s), the nanoparticle/water fluid stream is directed to either an electromagnet or to a housing containing permanent magnets, which produces a magnetic field that prevents the passage of the superparamagnetic nanoparticles. This separates the superparamagnetic nanoparticles from the pure water stream and allows the particles to be retained in the membrane area and maintained as a draw solute. Thus, still another object of the invention is to retain the superparamagnetic nanoparticles in the draw solution.

To capitalize on the increased flux resulting from higher temperature feedwater, an electric powered water heater and a thermostat temperature control system has been engineered into this PRO apparatus. Since this PRO system is a closed system with no significant material input or output, it is economically permissible to control its temperature above ambient temperature. To maximize the return on investment of the cost of increasing the temperature, the system contains thermal insulation cladding around its entirety. An electrically powered water heater could be placed on the water return line after the magnetic field created by permanent magnets or electromagnets, just before the water is returned to the feed water side of the water-tight enclosure. The electric water heater is controlled by a thermostat and a bulk permeate water temperature probe located on the water-tight enclosure.

Separation and isolation of the ferrofluid furthermore, makes for simple and efficient replacement of the ferrofluid, by isolating, removing and replacing the magnetic nanoparticle isolation tank.

DETAILED DESCRIPTION OF THE INVENTION

Figure 1:
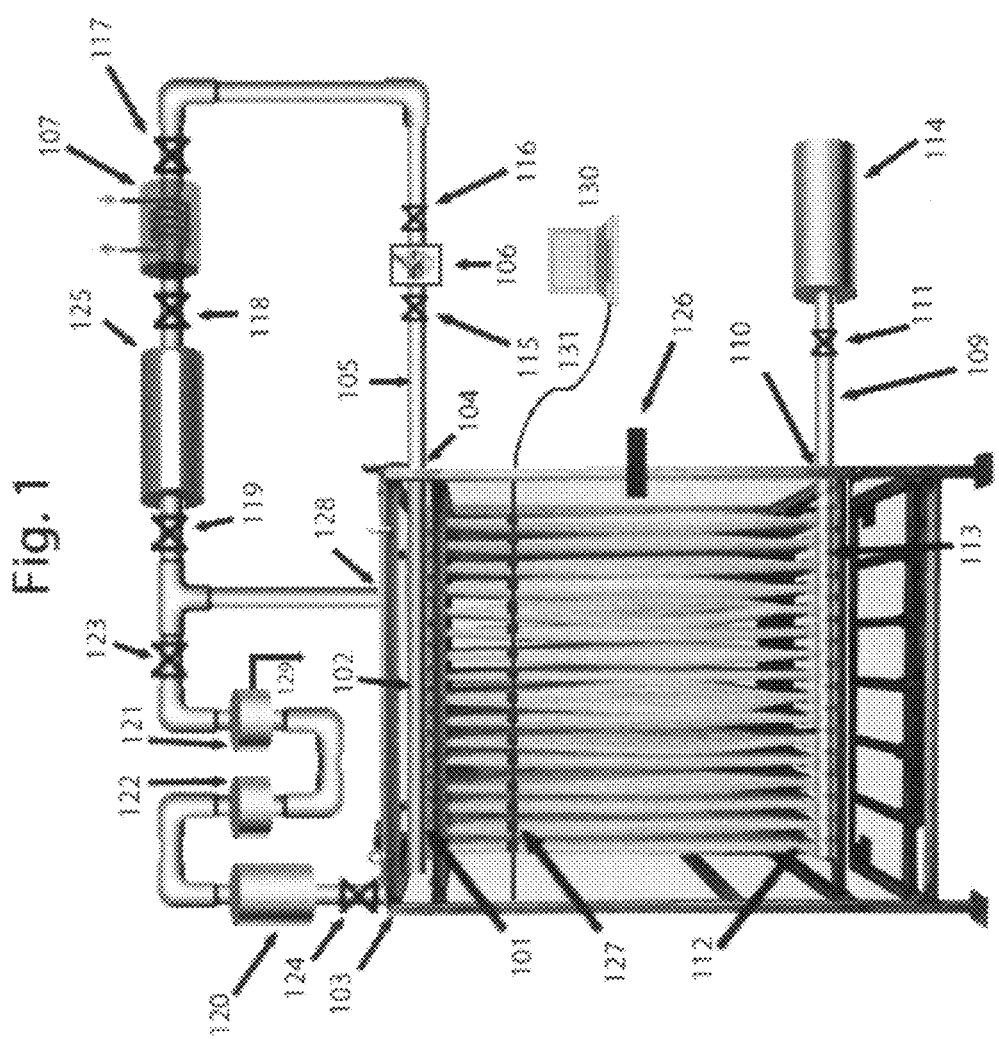
FIG. 1 is a close up view of the system with a movable electromagnetic lattice in the osmosis unit and a single effluent header and hydroturbine, detailing the single effluent header and its connection to the numerous top membrane headers.

In FIG. 1, a pressure retarded osmosis (PRO) system is shown. It consists of a hollow fiber membrane system submerged in a pure water bath contained within a water-tight enclosure. 'Pure water' in this case means as close to perfectly pure water as economically feasible. With increasingly contaminated water (contaminated with suspended solids, dissolved solids, and possibly biological material), will come a reduction in the difference between the osmotic pressures of the solutions on either side of the membrane. With less difference between osmotic pressures, will come a lower net driving force, lower flux rates, and lower energy generation rates. And with increasingly pure water will come an increasingly expensive price tag. A 'pure water bath' would consist of de-ionized water, approximately 5 to 10 micromhos per centimeter (μmhos/cm, a measure of conductivity typically used measure concentrations of dissolved solids in water). It is anticipated that during operation, the water bath would become more and more dirty with contaminants leaking into the system, with potential biological material, and with material being removed or eroded from the inside, wetted material surfaces of the PRO system. Also, if operational experience proves necessary, a strip-stream water purifier system could be used as an optional PRO system accessory. A strip-stream water purifier system would take a portion (for example 10% of the total water flow) of the return water, filter it, demineralize it, and subject it to an ultraviolet light for biologic control before returning it to the pure water enclosure. At the purification rate of 10%, on average, the entire water volume would be treated for every 10 cycles that the water is circulated.

In FIG. 1, the water-bath enclosure is numbered 103. An array of hollow fiber membrane bundles is submerged in the bath. Each bundle contains a large number, typically 500 to 1,000 hollow fibers. Each bundle is potted, or sealed, into a top membrane header 101 and a bottom membrane header 112. such that the fiber lumen, the inside of the hollow fiber, is open to the inside of the membrane headers and the pure water solvent is prevented from leaking into either the membrane header or into the inside of a hollow fiber membrane strand. In FIG. 1, the array consists of 16 bundles across by approximately 8 bundles deep.

The most common hollow fiber membrane materials, owing to their competitive performance and economic characteristics are cellulose acetates, nitrates, and esters (CA, CN, and CE), polysulfone (PS), polyether sulfone (PES), polyacrilonitrile (PAN), polyamide, polyimide, polyethylene and polypropylene (PE and PP), polytetrafluoroethylene (PTFE), polyvinylidene fluoride (PVDF), polyvinylchloride (PVC). The hollow fiber tubes are small with an inside diameter in the range of 10 to 100 microns (a micron is one-millionth of a meter) and an outside diameter in the range of 25 to 200 microns. Smaller diameter hollow fiber tubes are preferred to larger diameter fiber tubes by having more membrane surface area per unit volume of membrane.

The pure water solvent can however pass from the outside of the hollow fiber through tiny pores to the inside of a fiber strand owing to the osmotic pressure created by a highly concentrated, colloidal draw solution of superparamagnetic inside the hollow fibers. As water permeates a membrane, the volume and pressure of the water/draw solution on the inside of the hollow fiber membrane increases. The water/draw solution collects in the top membrane headers 101 into which the membrane bundles are potted.

Paramagnetism describes the characteristic that the nanoparticles are magnetic only while within an externally applied magnetic field and show no such magnetic characteristic absent the magnetic field. Therefore, the particles would not show a magnetic attraction to each other, but rather only in the direction of an external magnetic force field. The prefix 'super' in superparamagnetic refers to the nanoparticle's strength of magnetization and that it is many times greater than the magnetization of an ordinary paramagnetic particle. Superparamagnetism occurs when the nanoparticle is sufficiently small (~10 nm) so that the surface area is large relative to the particle's mass.

The types of superparamagnetic nanoparticles that are preferred have an iron oxide core with a shell that prevents the iron oxide from oxidizing. One such shell material is silica. These are called superparamagnetic iron oxide nanoparticles, or SPIONs. Some of the other materials used to make the core of the particle superparamagnetic are pure metals such as Fe, Ni and Co, and alloys such as $Fe_3O_4$, $Fe_2O_3$, $MgFe_2O_4$, $MnFe_2O_4$, $CoFe_2O_4$, $CoPt_3$, FePt, $FePt_3$ and CoO. The silica shell around the SPION provides it with chemical stability by preventing the iron oxide core (preferably magnetite [$Fe_3O_4$], or maghemite [$Fe_2O_3$]), from oxidizing, preventing them from agglomerating, or sticking to a neighboring particle and acts as a base that a functionalizing chemical dispersant coating can adhere to. Other inorganic shell materials of the core-shell nanoparticle include carbon, precious metals such as silver and gold, or their oxides, which can be created by gentle oxidation of the outer shell of the nanoparticles, or additionally deposited, such as $Y_2O_3$ (Yttrium oxide).

Chemical dispersants, also called surface ligands or polymers, are used to 'functionalize' the nanoparticle and thus maintain it in a stable suspension. In general, surfactants or polymers can be chemically anchored or physically adsorbed on magnetic nanoparticles, which creates repulsive forces (mainly as steric repulsion) to balance the magnetic and the van der Waals attractive forces acting on the nanoparticles. Thus, by steric repulsion, the magnetic particles are stabilized in suspension. When forming a stable, colloidal suspension, the nanoparticles are referred to as dissolved or hydrophilic. Polymers containing functional groups, such as carboxylic acids, phosphates, and sulfates, can bind to the surface of the nanoparticle. Suitable polymers for coating include poly(pyrrole), poly(aniline), poly(alkylcyanoacrylates), poly(methylidene malonate), and polyesters, such as poly(lactic acid), poly(glycolic acid), poly(e-caprolactone), and their copolymers.

In the design shown in FIG. 1, the top membrane headers 101 are connected to a single effluent header 102 that exits the pure water enclosure through water-tight fitting 104. Outside the enclosure, the effluent header, referenced as 105, is connected to a hydroturbine housing 106, with valves 115 and 116 being used to isolate the hydroturbine, if necessary. Because of increased pressure and volume, the water/draw solution stream acts upon the hydroturbine to produce electricity. Upon exiting the hydroturbine at lower pressure, the water/draw solution stream flows through a magnetic field that separates the superparamagnetic particles from the pure-water that is returned to the pure-water enclosure. The superparamagnetic nanoparticle draw solution is maintained in a uniform concentration from the magnetic field, through the hydroturbine, and throughout the membrane system. The magnetic field 107 may be created by either a solenoid-type electromagnet or a housing containing a series of permanent magnets.

To increase the temperature of the feedwater to the pure water bath, an optional electric water heater 125 could be placed just before the water is returned to the feed water side 128 is the water tight enclosure 103. The electric water heater is controlled by a bulk permeate temperature probe 126 located on the water-tight enclosure.

Figure 2:
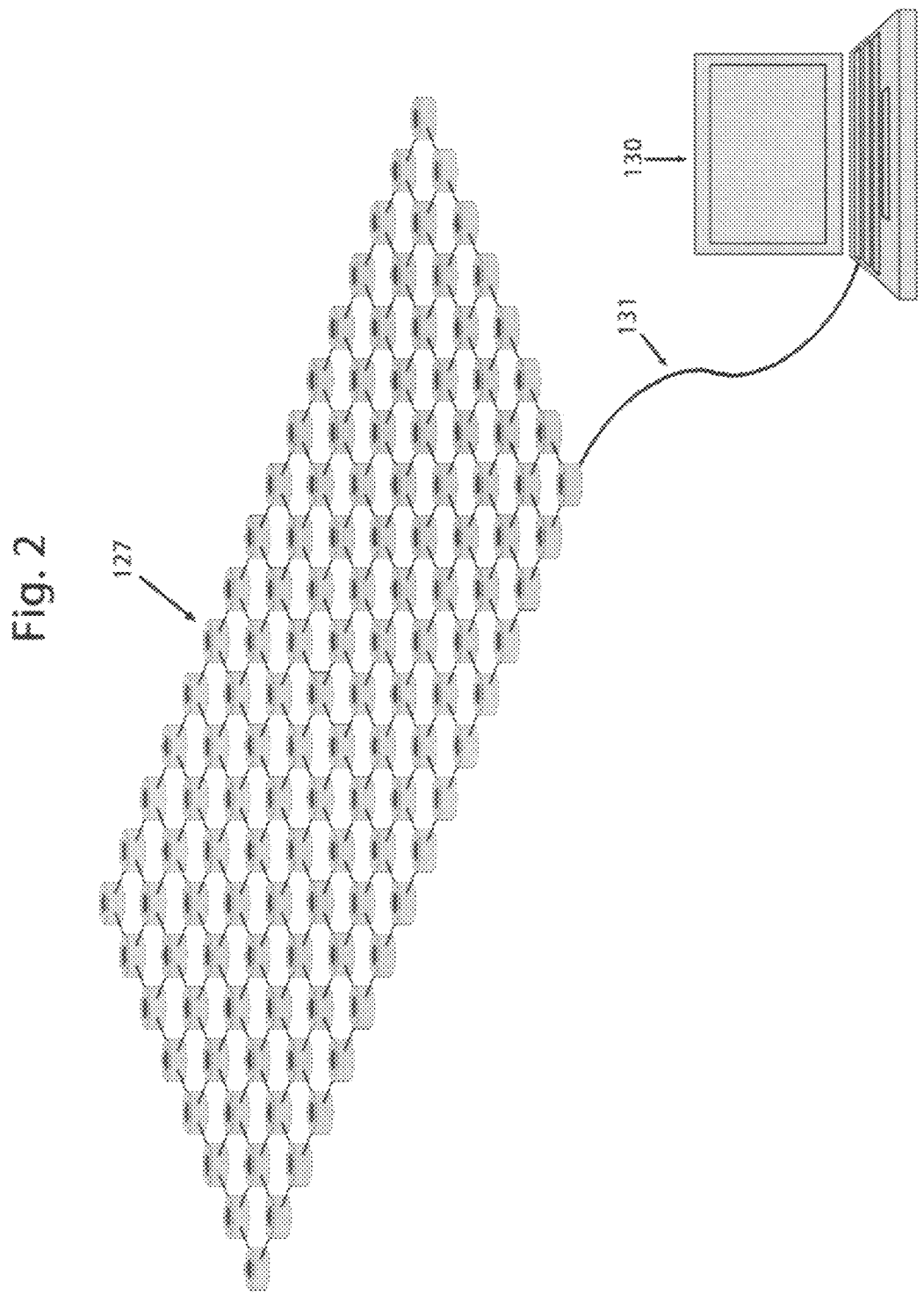
FIG. 2 is a view of a lattice of electromagnets connected to a controller.
Figure 5:
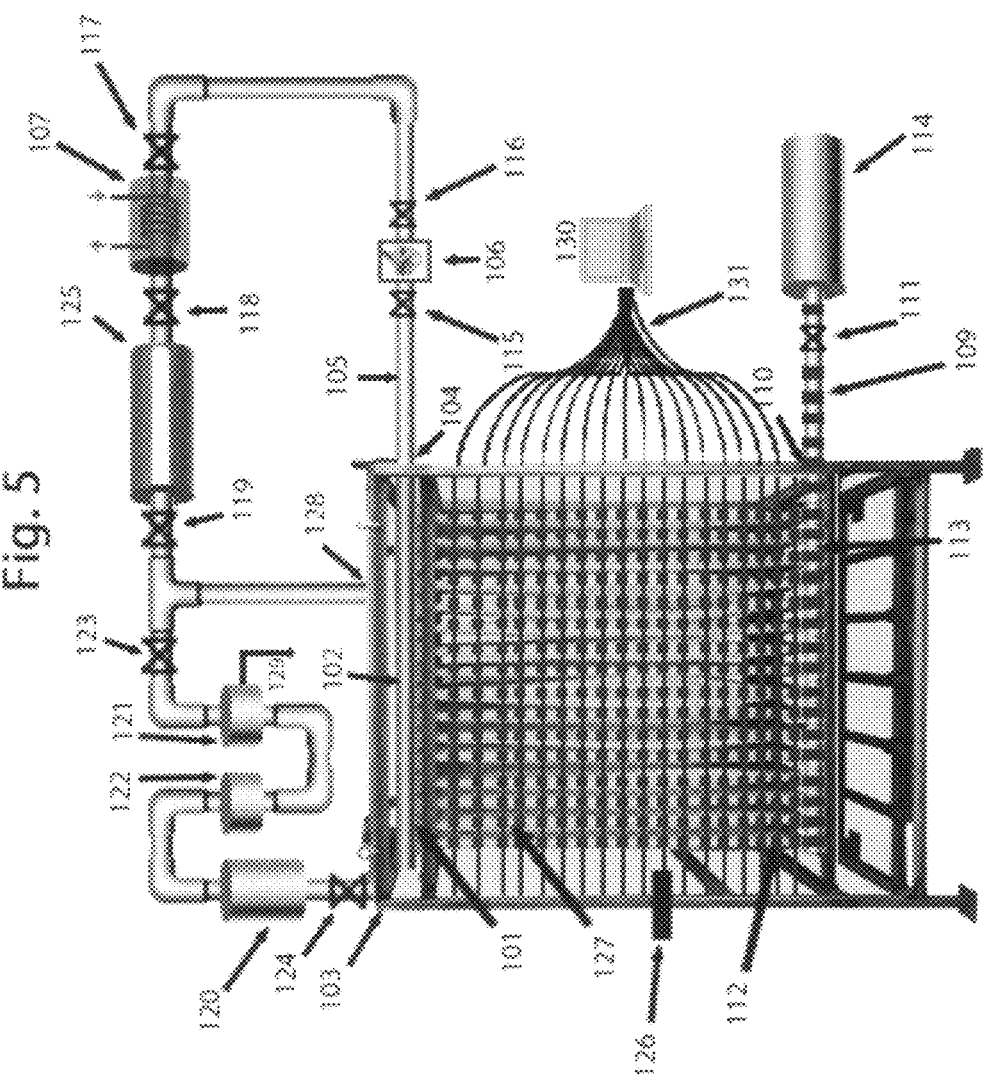
FIG. 5 is a view of the system with multiple stationary electromagnetic lattices in the osmosis unit and a single effluent header and hydroturbine, detailing the single effluent header and its connection to the numerous top membrane headers.

To be able to stop the operation of the PRO system, the ferrofluid must be able to be removed from the membrane surface area. The presents of nanoparticles in close physical proximity to the membrane constitutes osmotic pressure generating potential. It is only by removing the nanoparticles from the hollow fiber membranes that the feedwater will stop permeating the membrane and increasing the hydraulic pressure within the hollow fibers. The hydraulic pressure must be reduced before various types of service are performed on the PRO system. For instance, before the hydroturbine can be removed, before the magnetic field generation device can be opened, and even before an isolation valve can be closed, the osmotic pressure must be removed. If static hydraulic pressure is allowed to build without relief, hollow fiber membranes are likely to burst due to over pressurization. Removal of the nanoparticles from the hollow fiber membrane system is performed by creating a moving magnetic field in order to sweep the magnetic nanoparticles out of the hollow fiber membrane surface area, out the bottom of the PRO system. The moving magnetic field created can be created in two different ways. As shown in FIG. 5, the PRO unit is constructed with strata of rigidly connected lattices 127 of donut-shaped electromagnets, each donut-shaped magnet coinciding with the position of a hollow fiber membrane bundle that is contained within the donut hole. A lattice of such electromagnets is shown in greater detail in FIG. 2 along with wire connection 131 to its controller 130. Each rigid lattice is sequentially energized in a manner such that is generates a magnetic field capable of sweeping the magnetic nanoparticles out of the hollow fiber membrane area, to the lower membrane headers 112, to the bottom effluent header 113, and ultimately to the magnetic nanoparticle isolation tank 114. This passage to the isolation tank is described in greater detail below.

The second way of creating the moving magnetic field is by using and energizing just one lattice of rigidly connected donut-shaped electromagnets and physically moving it to the bottom of the PRO system. The rigid lattice travels from the top to the bottom along tracks located on the inside walls of the water-tight enclosure. As the lattice moves from the top to the bottom, its magnetic field sweeps the magnetic nanoparticles on the inside of the hollow fiber membranes, from top to bottom. The magnetic nanoparticles are forced by the moving magnetic field, to the bottom membrane headers 112, to the bottom effluent header 113, out of the water-tight enclosure 103, through the bulk-head fitting 110 to the effluent header 109 through an isolation valve 111, to the magnetic nanoparticle isolation tank 114. The magnetic nanoparticle removal procedure therefore separates the nanoparticles from the membrane surface area, thereby preventing water flux and the corresponding increase of hydrostatic pressure within the membrane system, and prepares the PRO system for maintenance or sub-system disassembly FIG. 1 shows optional, auxiliary technologies in a by-pass loop that may provide useful functionality designed into the PRO system, but may also be provided on an external, manual service basis. If these ancillary technologies are not built into the PRO system, the system is likely to operate less efficiently, or will operate for a shorter period of time before operational inefficiency and perhaps complete failure, would occur. These include the control of suspended solids in the water with an in-line suspended solids filter 121, the control of dissolved solids in the water with an ion exchange resin bed 122, and the control of microbes in the water with an ultraviolet (UV) light 120. Therefore, a removable water treatment by-pass loop containing each of these three auxiliary technologies may be located between isolation valves 123 and 124. The isolation valve 123 connects to a "T" fitting located between the electric water heater 125, and the water return to the watertight enclosure 128. The isolation valve 124 is located between the UV light 120, and the inlet to the water-tight enclosure 103. Isolation valve 119 is located between the temperature control heater 125, and the water return to the water-tight enclosure 128. Valves 118 and 119 can be used to isolate the temperature control heater for maintenance. Since there is a pressure difference between the feedwater side and the permeate side of the membrane, (with a sufficiently high pressure differential remaining after the hydroturbine), positive flow of water through the by-pass loop can be assured.

By-pass loop is isolated by valves 123, and 124 to enable removal and service of the by-pass loop, and associated auxiliary technology system components. Valve 123 can be throttled to adjust the amount of water that goes through the by-pass loop and how much water is returned directly the water-tight enclosure 128. It is anticipated to be relatively small percentage of the overall system flow, perhaps 10%.

The suspended solids filter 121 is a media filter, consisting of various types of media such as, anthracite, sand, garnet, cloth, paper, etc., with or without periodic washing, with washwater drain 129.

The dissolved solids control 122, also called demineralization, is performed by various types of ion exchangers consisting of a multitude of ion exchange technologies. Most modern ion exchange systems utilize polystyrene-divinylbenzene based resins, configured as either strong acid cation, weak acid cation, strong base anion, and/or weak base anion, or some combination there of. Ion exchange resin systems can consist of mixed resins, or for larger systems can consist of isolated ion exchangers in series, either with or without their own chemical regeneration control.

Microbial control is maintained with an ultraviolet (UV) light 120. The advantage of UV microbial control in a PRO application, is that it is not chemical based, and therefore, does not add a dissolved solid to the feedwater. Any dissolved solids left in the feedwater would reduce the osmotic driving force, and hence the flux and power density of the PRO system.

Figure 3:
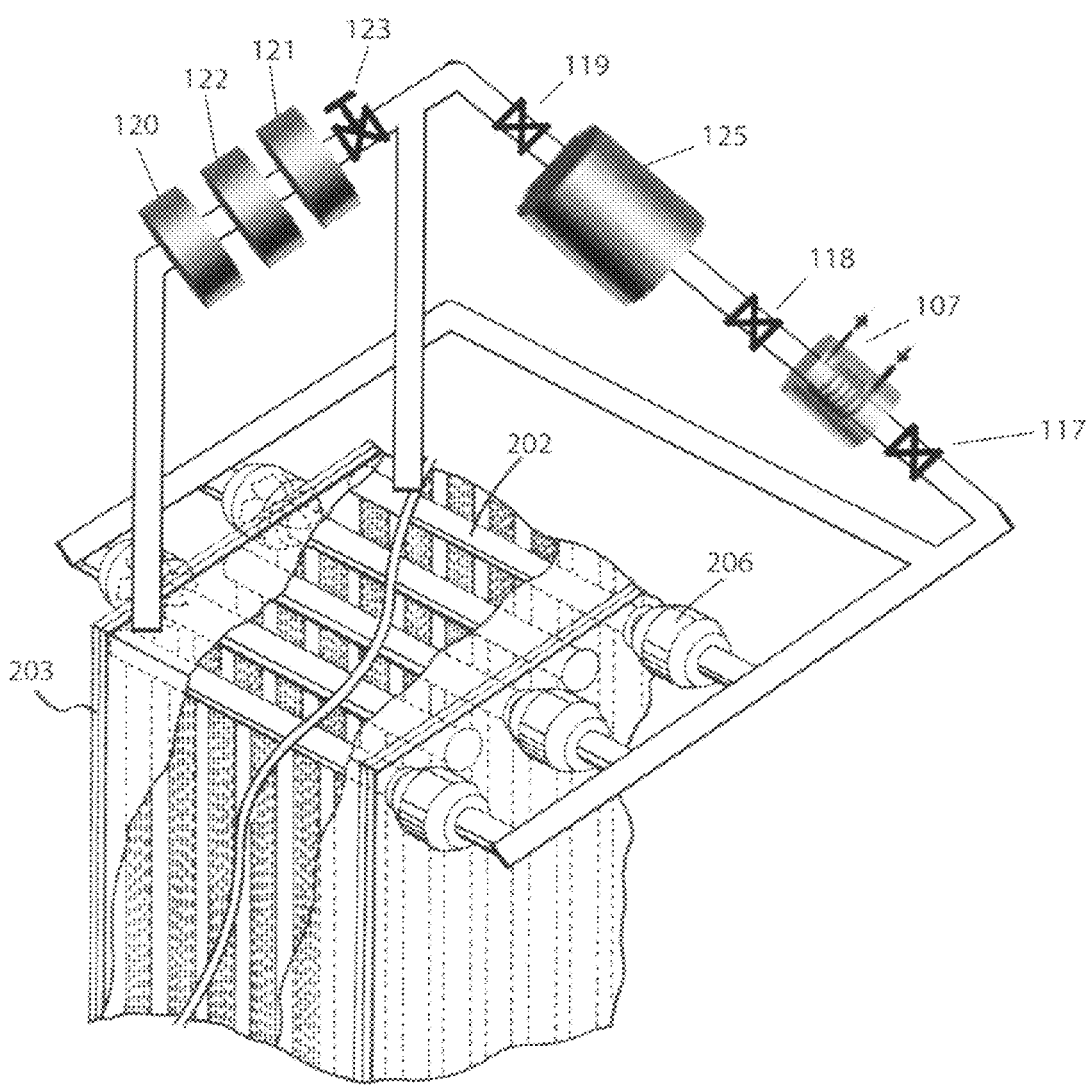
FIG. 3 is a view of the system with a hydroturbine associated with each membrane header.

FIG. 3 shows a system where there is a hydroturbine 206 for each membrane header 202 with piping 204 from each hydroturbine converging before entering magnetic field 107. After the piping converges the system external to the osmosis unit is identical to the system with a single hydroturbine.

Figure 4:
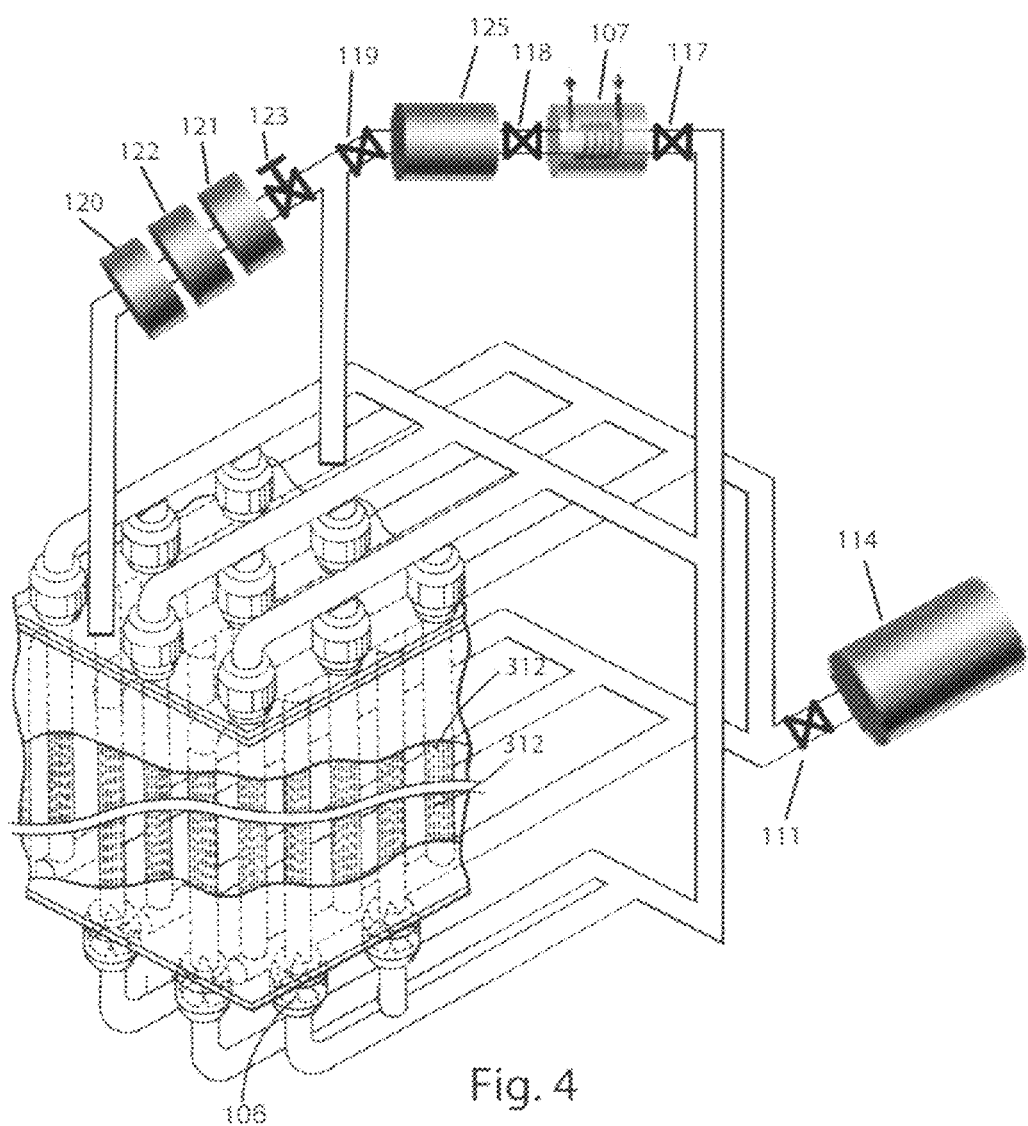
FIG. 4 is a view of the system with a hydroturbine associated with each membrane bundle.

FIG. 4 shows a system where there is an effluent header and hydroturbine 306 for each membrane bundle 100. As with the system shown in FIG. 3, piping 304 from each hydroturbine converging before entering magnetic field 107. After the piping converges the system external to the osmosis unit is identical to the system with a single hydroturbine.

FIG. 5 shows a system with a single hydroturbine but with multiple layers of stationary lattices 127 of electromagnets connected to a controller. In this embodiment, the lattices are activated sequentially to control movement of the superparamagnetic nonoparticles.

I claim:

1. A pressure retarded osmosis system for the production of electricity comprising:
    a rigid water-tight enclosure filled with pure water;
    an array of bundles of hollow fiber membrane tubes, each bundle having a multiplicity of hollow fiber tubes and each hollow fiber tube having a multiplicity of pores, each hollow fiber tube acting as a semi-permeable membrane submerged in the pure water bath, the hollow fiber tubes permeated by the pure water and each bundle securely attached to a bottom membrane header and a top membrane header;
    a draw solution consisting of pure water with a highly concentrated colloidal solution of ligand-coated superparamagnetic nanoparticles, the superparamagnetic nanoparticles having a diameter larger than the diameter of the pores in the hollow fiber tubes;
    at least one hydroturbine through which permeate and draw solution leaving the water-tight enclosure pass;
    a magnetic field that prevents further passage of the superparamagnetic nanoparticles in the draw solution leaving the hydroturbine;
    a water heater heating the water passing through the magnetic field before it is returned to the water-tight enclosure outside of the membrane bundles; and
    a computer-controlled lattice of donut-shaped electromagnets each with a donut hole, a bundle of hollow fiber membrane tubes contained within each donut hole, and the lattice movable between the top membrane header and the bottom membrane header.

2. A pressure retarded osmosis system as set forth in claim 1 further comprising an isolatable loop with an in-line line suspended solids filter, an ion exchange resin bed for controlling dissolved solids, ultraviolet light for controlling microbes, and a superparamagnetic nanoparticle isolation tank.

3. A pressure retarded osmosis system as set forth in claim 2 wherein there is a single hydroturbine to which permeate and draw solution are fed from an effluent header fed from a plurality of membrane headers, each membrane header containing permeate and draw solution from a plurality of bundles.

4. A pressure retarded osmosis system as set forth in claim 2 wherein there is a plurality of hydroturbine, each hydroturbine being fed from a membrane header, each membrane header containing permeate and draw solution from a plurality of bundles.

5. A pressure retarded osmosis system as set forth in claim 2 wherein there is a plurality of hydroturbine, each hydroturbine being fed from a membrane header, each membrane header containing permeate and draw solution from one bundle.

6. A pressure retarded osmosis system as set forth in claim 1 wherein there is a single hydroturbine to which permeate and draw solution are fed from an effluent header fed from a plurality of membrane headers, each membrane header containing permeate and draw solution from a plurality of bundles.

7. A pressure retarded osmosis system as set forth in claim 1 wherein there is a plurality of hydroturbine, each hydroturbine being fed from a membrane header, each membrane header containing permeate and draw solution from a plurality of bundles.

8. A pressure retarded osmosis system as set forth in claim 1 wherein there is a plurality of hydroturbine, each hydroturbine being fed from a membrane header, each membrane header containing permeate and draw solution from one bundle.

9. A pressure retarded osmosis system for the production of electricity comprising:
   a rigid water-tight enclosure filled with pure water;
   an array of bundles of hollow fiber membrane tubes, each bundle having a multiplicity of hollow fiber tubes and each hollow fiber tube having a multiplicity of pores, each hollow fiber tube acting as a semi-permeable membrane submerged in the pure water bath, the hollow fiber tubes permeated by the pure water and each bundle securely attached to a bottom membrane header and a top membrane header;
   a draw solution consisting of pure water with a highly concentrated colloidal solution of ligand-coated superparamagnetic nanoparticles, the superparamagnetic nanoparticles having a diameter larger than the diameter of the pores in the hollow fiber tubes;
   at least one hydroturbine through which permeate and draw solution leaving the water-tight enclosure pass;
   a magnetic field that prevents further passage of the superparamagnetic nanoparticles in the draw solution leaving the hydroturbine;
   a water heater heating the water passing through the magnetic field before it is returned to the water-tight enclosure outside of the membrane bundles; and
   strata of stationary computer-controlled lattices of donut-shaped electromagnets each with a donut hole, a bundle of hollow fiber membrane tubes contained within each donut hole, and the lattices activated sequentially to move the superparamagnetic nanoparticles between the top membrane header and the bottom membrane header.

10. A pressure retarded osmosis system as set forth in claim 9 further comprising an isolatable loop with an in-line line suspended solids filter, an ion exchange resin bed for controlling dissolved solids, ultraviolet light for controlling microbes, and a superparamagnetic nanoparticle isolation tank.

11. A pressure retarded osmosis system as set forth in claim 10 wherein there is a single hydroturbine to which permeate and draw solution are fed from an effluent header fed from a plurality of membrane headers, each membrane header containing permeate and draw solution from a plurality of bundles.

12. A pressure retarded osmosis system as set forth in claim 11 wherein there is a single hydroturbine to which permeate and draw solution are fed from an effluent header fed from a plurality of membrane headers, each membrane header containing permeate and draw solution from a plurality of bundles.

13. A pressure retarded osmosis system as set forth in claim 10 wherein there is a plurality of hydroturbine, each hydroturbine being fed from a membrane header, each membrane header containing permeate and draw solution from a plurality of bundles.

14. A pressure retarded osmosis system as set forth in claim 10 wherein there is a plurality of hydroturbine, each hydroturbine being fed from a membrane header, each membrane header containing permeate and draw solution from one bundles.

15. A pressure retarded osmosis system as set forth in claim 9 wherein there is a plurality of hydroturbine, each hydroturbine being fed from a membrane header, each membrane header containing permeate and draw solution from a plurality of bundles.

16. A pressure retarded osmosis system as set forth in claim 9 wherein there is a plurality of hydroturbine, each hydroturbine being fed from a membrane header, each membrane header containing permeate and draw solution from one bundles.

* * * * *